United States Patent [19]
Dietrich et al.

[11] Patent Number: 5,015,082
[45] Date of Patent: May 14, 1991

[54] MICROSCOPE HAVING A BINOCULAR TUBE WITH RELATIVELY ROTATABLE TUBE ARMS

[75] Inventors: Peter Dietrich; Klaus Westphal, both of Oberkochen, Fed. Rep. of Germany

[73] Assignee: Carl-Zeiss-Stiftung, Heidenheim, Fed. Rep. of Germany

[21] Appl. No.: 469,361

[22] Filed: Jan. 24, 1990

[30] Foreign Application Priority Data

Mar. 18, 1989 [DE] Fed. Rep. of Germany ....... 8903394

[51] Int. Cl.$^5$ ...................... G02B 23/04; G02B 27/14
[52] U.S. Cl. .................................... 350/514; 350/145; 350/171
[58] Field of Search ............... 350/514, 513, 511, 551, 350/552, 145, 146, 139, 173, 171

[56] References Cited

U.S. PATENT DOCUMENTS 2,634,654  4/1953  Bauersfeld ........................... 350/514

FOREIGN PATENT DOCUMENTS 179902  10/1954  Austria ................................. 350/173
1217099  5/1966  Fed. Rep. of Germany ...... 350/516
483  of 1909  United Kingdom ................ 350/173

OTHER PUBLICATIONS

Ridgeview Enterprises, "Some . . . Myopter", *Optometric Weekly*, Feb. 28, 1974, p. 52.

*Primary Examiner*—Jon W. Henry
*Attorney, Agent, or Firm*—Walter Ottesen

[57] ABSTRACT

The invention is directed to a microscope having a binocular tube of the Siedentopf type. With this microscope, two different viewing elevations can be adjusted at a fixed viewing angle notwithstanding the simplest mechanical and optical configuration. The optical configuration of the microscope is achieved in that the first tube arm is journalled so as to be freely rotatable on the microscope support about the optical axis. The second tube arm is journalled on the first tube arm so as to be rotatable about the common optical axis.

9 Claims, 3 Drawing Sheets

MICROSCOPE HAVING A BINOCULAR TUBE WITH RELATIVELY ROTATABLE TUBE ARMS

FIELD OF THE INVENTION

The invention relates to a microscope having a binocular tube of the Siedentopf type wherein different viewing elevations are adjusted.

BACKGROUND OF THE INVENTION

A microscope of the kind referred to above and equipped with a binocular tube is described in U.S. Pat. No. 4,691,997. In this microscope, the adjustment of the ocular to the spacing of the eyes of the viewer takes place in accordance with the Siedentopf principle without a change of the mechanical tube length. The binocular tube is pivoted at the microscope support to vary the viewing elevation; this, however, changes the viewing angle. The optical axis of the microscope support must be adapted to the pivoted optical axis of the binocular tube. A mirror is arranged in the microscope support which is rotatable about a horizontal axis and for this adaptation, the mirror is rotated with the binocular tube through half the angle through which the binocular tube itself is rotated.

A special microscope tube developed especially with respect to ergonomic considerations is described in published German patent application DE-OS 33 05 650. This tube permits the viewing elevation and the viewing angle to be adjusted independently of each other. However, this is performed at the price that three rotatable mirrors must be rotated therewith in correspondence to the adjustment of viewing elevation U.S. Pat. No. 1,807,613 discloses a microscope tube having three oculars of which two are attached to a base body so as to be rotatable. However, the optical configuration of this tube has a greater complexity than the microscope according to the Siedentopf type.

SUMMARY OF THE INVENTION

It is an object of the invention to provide a microscope having a binocular tube of the simplest mechanical and optical configuration with which different viewing elevations can be adjusted.

According to a feature of the invention, the binocular tube is adjustable in two positions displaced by 180° about the optical axis of the binocular tube.

The microscope according to the invention affords the advantage that the two viewing elevations can be adjusted only at the binocular tube. A rotatable mirror in the microscope support is unnecessary. Accordingly, the corresponding drive means is unnecessary which rotate the mirror through half the angle through which the binocular tube is pivoted. For the user, this affords the advantage that a change of the viewing elevation has no influence on the viewing angle so that a viewing angle favorable with respect to ergonomic considerations is maintained for the elevation adjustment. This new binocular tube is especially well suited for simple microscopes which until now had only a single viewing elevation.

In an advantageous embodiment of the invention, these two positions displaced by 180° can be adjusted without any assembly activity simply by means of a rotation of the entire binocular tube about its optical axis.

A rotation of the binocular tube through 180° about its optical axis however transposes the left and the right ocular with respect to each other so that a diopter compensation at the oculars may have to be repeated after rotation of the tube. However, this new diopter compensation is not needed if the positions displaced by 180° can be obtained by means of a rotation of both ocular arms with respect to each other. This is made possible in that the first tube arm of the binocular tube is attached to the microscope support so as to be freely rotatable about its own optical axis and the second tube arm is attached to the first tube arm so as to be rotatable about the common optical axis.

In this connection, it is important that the adjusting range for the eye spacing in the second viewing elevation is not limited. For this reason, the angular range through which the second tube arm is rotatable with respect to the first tube arm must have a value of at least 360° less twice the value of the angle at which the two tube arms are pivotally bent during adjustment to the smallest eye spacing.

The manufacturing cost of the tube can be held low if mirrors for beam deflection are provided in the binocular tube in lieu of the otherwise conventional prisms. This is of special interest since the microscope according to the invention permits a mirror tube having a tube factor of 1x to be realized.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
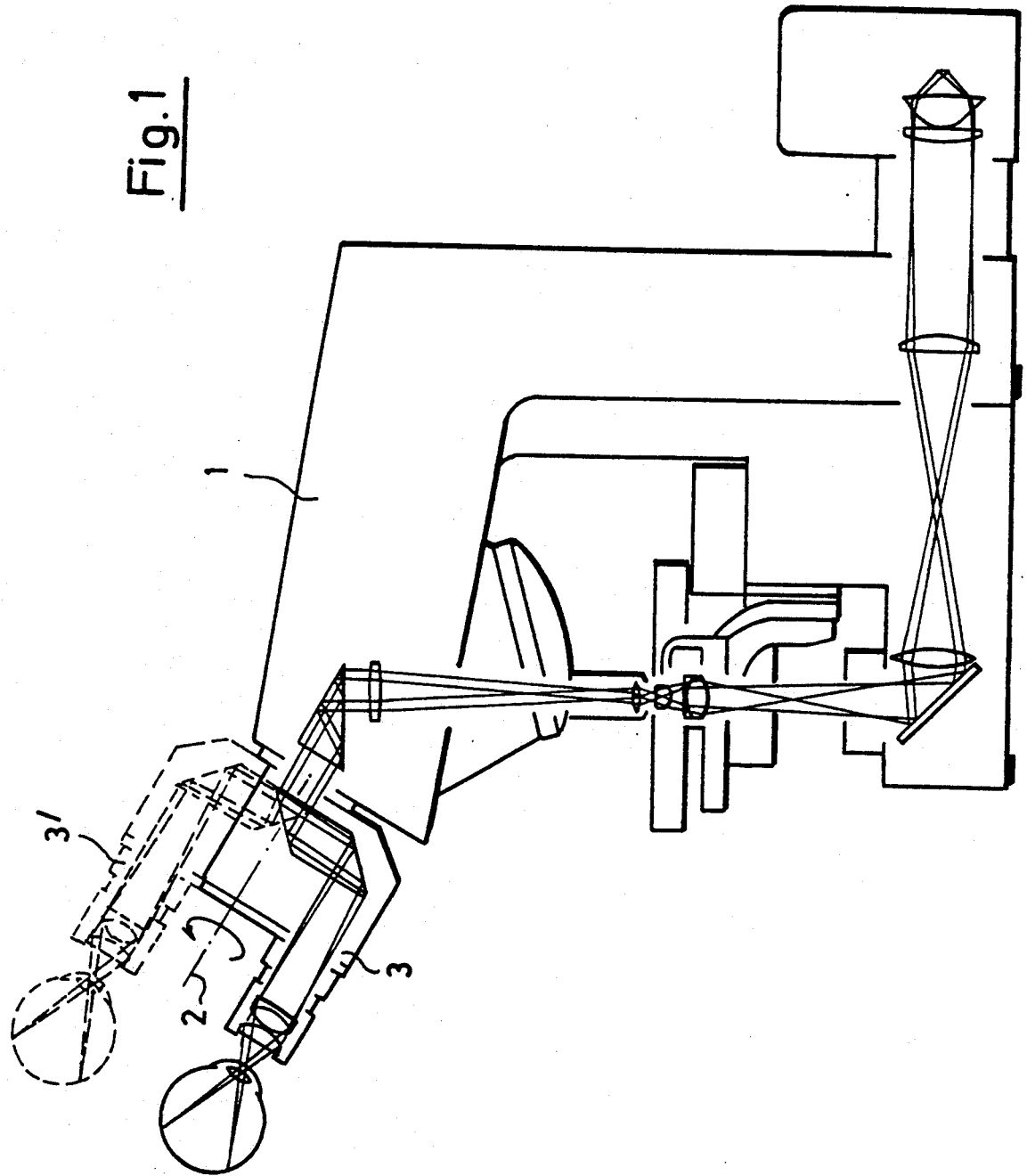
FIG. 1 is a side elevation view of the microscope according to the invention and shows the two positions of the binocular tube displaced by 180° with respect to each other.

In FIG. 1, the microscope support is identified by reference numeral 1. The optical axis 2 of the support at the ocular end defines an angle of 30° with the horizontal. This angle is very favorable from an ergonomic aspect. Reference numeral 3 identifies the binocular tube in its lower position. The binocular tube can be displaced through 180° about the optical axis 2 into position 3', shown in phantom outline. The viewing elevation then increases by approximately 35 mm without a change in the viewing angle.

In a conventional binocular tube of the Siedentopf type, both tube arms of the binocular tube are rotatably attached to a cylindrical support which passes through the binocular tube. This support defines the mechanical rotational axis of the binocular tube. The support contains two breakouts through which the beam dividers and deflecting prisms project into the support. Stops fix the minimum and maximum angle which is adjustable between the two tube arms. The stops prevent the edges of the breakouts and the prisms from colliding with each other.

Figure 2:
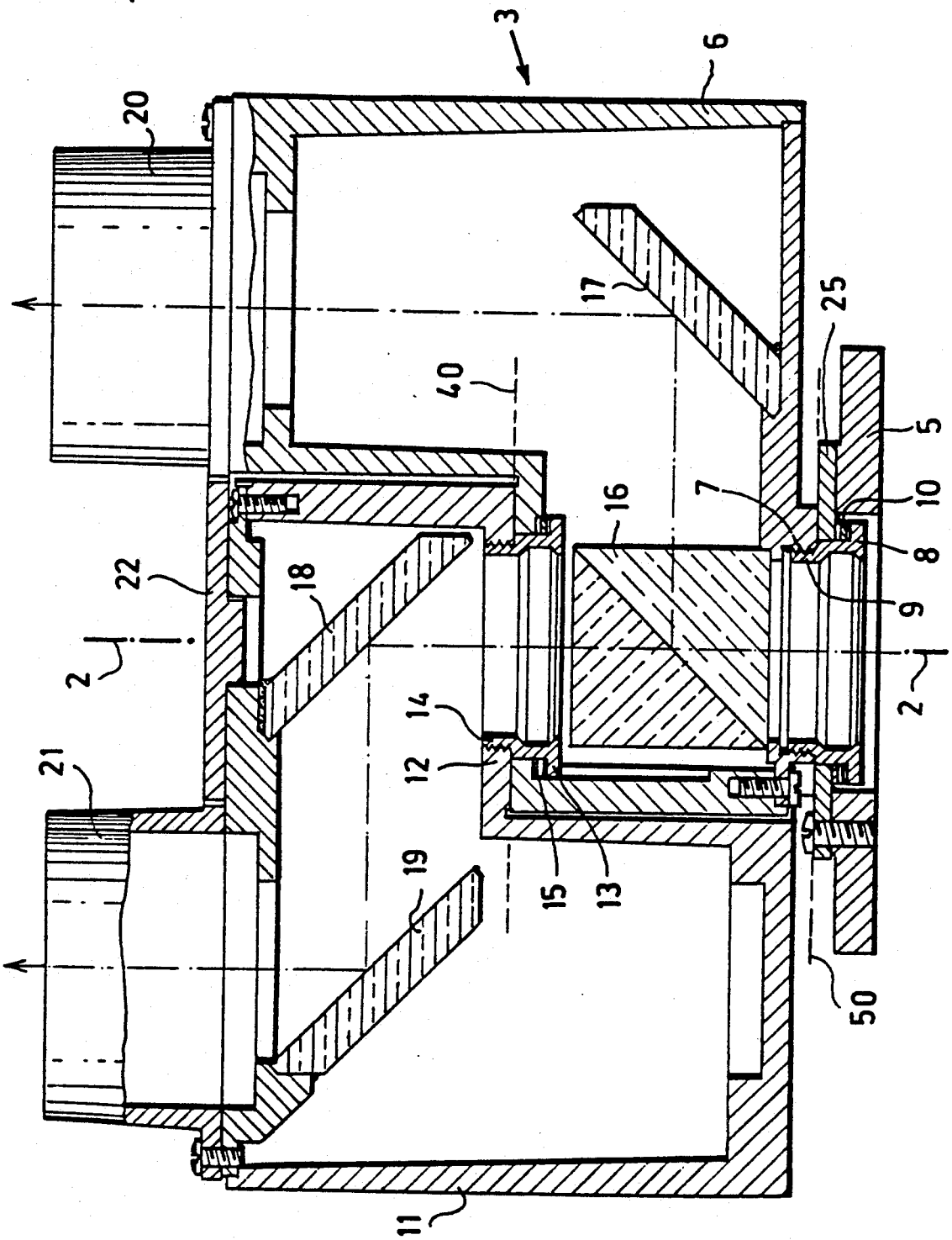
FIG. 2 is a section view taken through the binocular tube of the microscope of FIG. 1 in a plane containing the optical axes; and, FIG. 3 is a perspective front view of the upper portion of the microscope shown in FIG. 1.

According to the invention, no such through-extending rotational axis is provided. As FIG. 2 shows, the first tube arm 6 of the binocular tube 3 is mounted on a holding plate 5 so as to be freely rotatable. The holding plate 5 is, in turn, attached to the microscope support 1.

The first tube arm 6 has an internal thread centered on the optical axis 2. A bearing shaft 8 is centered on the optical axis 2 and is fitted into a ring attached to the holding plate 5. The bearing shaft 8 is threadably engaged with the tube arm 6 by means of an outer winding 9. The slide surfaces between the bearing shaft 8 and the ring 25 function as a radial rotational bearing. In the axial direction, the bearing is defined by the slide surfaces at bearing interface 50 between the ring 25 and the first tube arm 6. A corrugated disc 10 is provided for adjusting the braking force of the bearing and is pressed together between the bearing shaft 8 and the ring 25.

In the same manner, the second tube arm 11 is rotatably attached to the first tube arm 6. The second tube arm has an internal thread 12 centered on the optical axis 2. A bearing shaft 13 is fitted into the first tube arm 6 so that it is centered on the optical axis 2. The bearing shaft 13 has an outer thread 14 and is threadably engaged with the second tube arm 11 via the threads (12, 14). The slide surfaces between the bearing shaft 13 and the first tube arm 6 act as a radial rotational bearing. In the axial direction, the bearing is defined by the slide surfaces at bearing interface 40 between the two tube arms (6, 11). A second corrugated disc 15 acts to adjust the braking force and is pressed together between the first tube arm 6 and the bearing shaft 13 on the second tube arm 11.

A sleeve 20 is threadably engaged on the first tube arm 6 and a sleeve 21 is threadably engaged on the second tube arm 11. The sleeves (20, 21) accommodate the respective insert oculars (23, 24) shown in FIG. 3. A cover disc 22 prevents dust from penetrating into the binocular tube. The cover disc 22 has a scale which indicates the adjusted eye spacing.

The beam divider prism 16 and the deflecting mirror 17 are disposed exclusively in the first tube arm 6. In this way, the free rotatability of the first tube arm 6 about the optical axis relative to the holding plate 5 is assured. Nothing is changed with respect to the free rotatability if the beam divider prism 16 and the deflecting mirror 17 are replaced by a single beam dividing and deflecting prism.

The deflecting mirrors (18, 19) are disposed exclusively in the second tube arm 11. The rotatability of both tube arms (6, 11) relative to each other is only limited in that the two tube arms will sometimes collide with each other at their outer surfaces. Here too nothing is changed when a prism is utilized for deflecting the beam in lieu of the deflecting mirrors (18, 19). However, the use of mirrors in lieu of the otherwise conventional prisms is preferred because of cost reasons.

Figure 3:
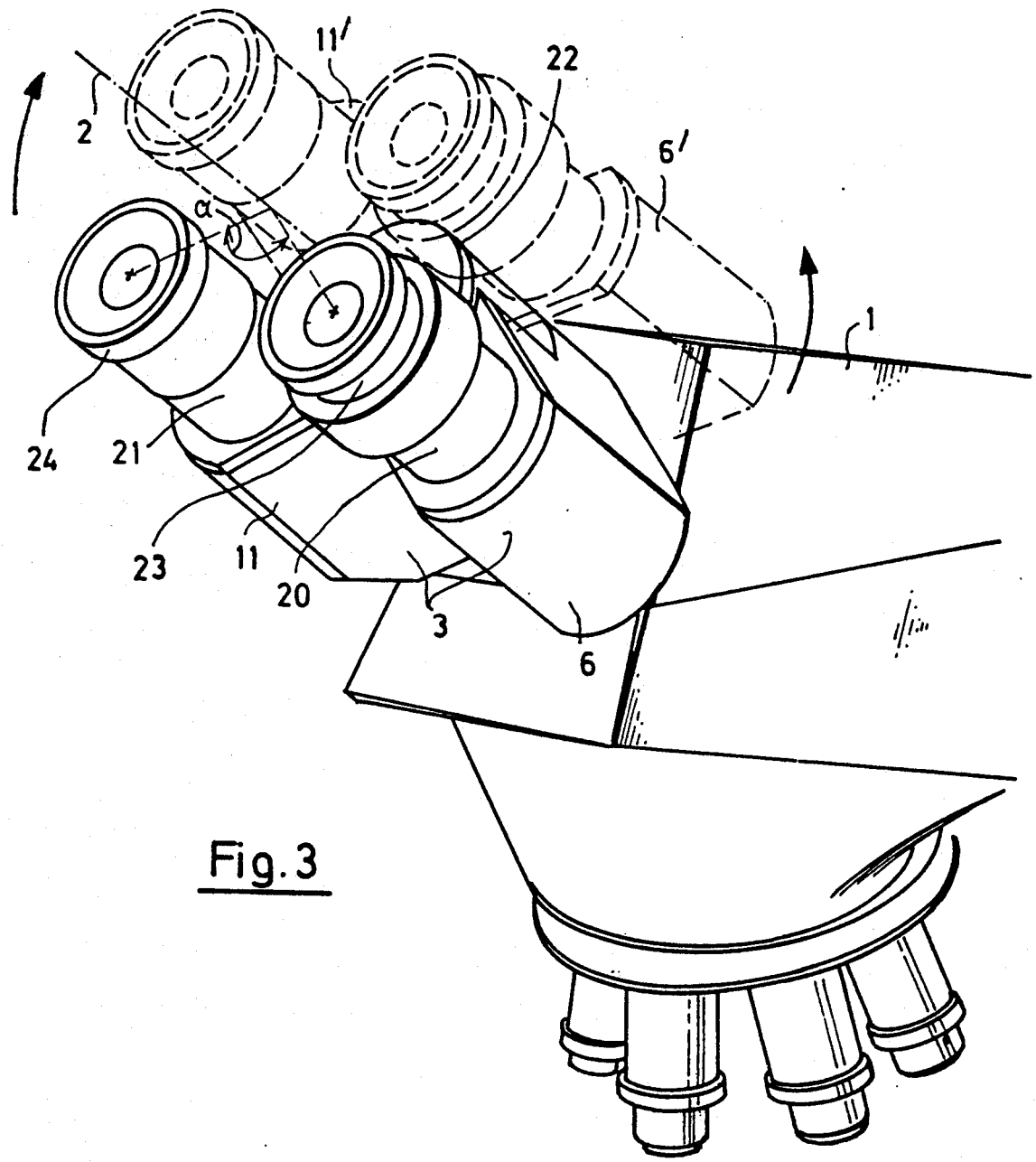

The tube according to the invention permits the ocular spacing in the lower position shown in FIG. 3 to be varied over a range of 55 mm to 75 mm. Furthermore, the angle at which the two tube arms are inclined to each other can be increased by a rotation of the two tube arms in correspondence to the arrows shown. The tube arms (6, 11) then move into the positions (6', 11') which are symmetrical with reference to the optical axis 2. In this way, the viewing elevation is increased by approximately 35 mm.

The two oculars are not transposed because of the foregoing so that a new dioptric compensation is superfluous. The angular range at which the two tube arms (6, 11) can be inclined with respect to each other must have at least the value (360°−2α) so that the eye spacing can be adjusted to a minimum value of 55 mm also in the upper position of the ocular tube as shown in phantom outline. The mirror tube constructed in correspondence to FIG. 2 has a tube factor of 1x.

It is understood that the foregoing description is that of the preferred embodiments of the invention and that various changes and modifications may be made thereto without departing from the spirit and scope of the invention as defined in the appended claims.

What is claimed is:

1. A microscope comprising:
a support;
an optical system arranged in said support for defining a beam path to an object;
a binocular tube defining an optical axis and having a first tube arm and a second tube arm;
mounting means for mounting said binocular tube on said support so as to interface with said optical system;
positioning means for permitting said binocular tube to be positionable into first and second viewing positions about said optical axis with said viewing positions being at respectively different elevations; and,
said positioning means including: first bearing means for rotatably journalling said first tube arm in said mounting means so as to permit said first tube arm to rotate through a complete revolution about said optical axis; and, second bearing means for rotatably journalling said second tube arm in said first tube arm so as to permit said second tube arm to rotate about said optical axis relative to said first tube arm.

2. A microscope comprising:
a support;
an optical system arranged in said support for defining a beam path to an object;
a binocular tube of Siedentopf type defining an optical axis and having a first tube arm and a second tube arm;
first rotatable bearing means for rotating the tube arms relative to each other to adjust the ocular spacing to the eye spacing of an observer;
mounting means for mounting said binocular tube on said support so as to interface with said optical system;
positioning means for permitting said binocular tube to be positionable into first and second viewing positions about said optical axis with said viewing positions being at respectively different elevations;
said positioning means including: second bearing means for rotatably journalling said first tube arm in said mounting means so as to permit said first tube arm to rotate through a complete revolution about said optical axis; and,
said first rotatable bearing means being configured for rotatably journalling said second tube arm in said first tube arm so as to permit said second tube arm to rotate about said optical axis relative to said first tube arm through an angular range of at least (360°−2α) wherein α is an angle between said first and second tube arms when said tube arms are rotated relative to each other to accommodate a predetermined smallest eye spacing.

3. The microscope of claim 2, said binocular tube including mirrors to deflect light passing into said binocular tube from said optical system.

4. The microscope of claim 3, said binocular tube having a unity body magnification.

5. The microscope of claim 2, said binocular tube including a beam divider prism to deflect light into said first and said second tube arms.

6. The microscope of claim 5, said divider prism being mounted in said first tube arm.

7. The microscope comprising:

a support;

an optical system arranged in said support for defining a beam path to an object;

a binocular tube of Siedentopf type defining an optical axis and having a first L-shaped tube arm and a second L-shaped tube arm;

rotatable joint means for rotating the tube arms relative to each other to adjust the ocular spacing to the eye spacing of an observer;

said first and second L-shaped tube arms having respective first legs and being closely juxtaposed so as to cause said first legs to virtually completely overlap each other and cause said optical axis to pass through said first legs thereby providing a substantially rectangular overall compact configuration of said two tube arms;

said first leg of said first arm and said first leg of said second arm conjointly defining a bearing interface;

said rotatable joint means being disposed at said interface so as to permit said first legs to bear on each other as said arms are rotated relative to each other to adjust said ocular spacing;

mounting means for mounting said binocular tube on said support so as to interface with said optical system;

positioning means for permitting said binocular tube to be positionable into first and second viewing positions about said optical axis with said viewing positions being at respectively different elevations;

said positioning means including: rotatable bearing means for rotatably journalling said first tube arm in said mounting means so as to permit said first tube arm to rotate about said optical axis; and, said rotatable joint means being configured for rotatably journalling said second tube arm in said first tube arm so as to permit said second tube arm to rotate about said optical axis relative to said first tube arm through an angular range of at least $(360° - 2\alpha)$ wherein $\alpha$ is an angle between said first and second tube arms when said tube arms are rotated relative to each other to accommodate a predetermined smallest eye spacing.

8. A microscope comprising:

a support;

an optical system arranged in said support for defining a beam path to an object;

a binocular tube of Siedentopf type defining an optical axis and having a first tube arm and a second tube arm;

said first tube arm having an outer surface defining a first bearing face and said second tube arm having an outer surface defining a second bearing face directly next to said first bearing face;

a first rotatable joint assembly for rotating the tube arms relative to each other to adjust the ocular spacing to the eye spacing of an observer;

said first rotatable joint assembly including: a first bearing interface conjointly defined by said first and second bearing faces for supporting said tube arms in the direction of said axis as said arms are rotated relative to each other; and, first rotatable joint means arranged at said bearing interface for rotatably connecting said arms to each other;

mounting means for mounting said binocular tube on said support so as to interface with said optical system;

said mounting means having a bearing surface defining a third bearing face and said outer surface of said first tube arm defining a fourth bearing face directly next to said third bearing face;

a second rotatable joint assembly for permitting said binocular tube to be rotatable into first and second viewing positions about said optical axis with said viewing positions being at respectively different elevations;

said second rotatable joint assembly including: a second bearing interface conjointly defined by said third bearing face and said fourth bearing face for supporting said first tube arm in the direction of said axis as said first tube arm is rotated on said mounting means; and, second rotatable joint means arranged at said second bearing interface for rotatably connecting said first tube arm to said mounting means; and, said first rotatable joint means being configured for rotatably journalling said second tube arm in said first tube arm so as to permit said second tube arm to rotate about said optical axis relative to said first tube arm through an angular range of at least $(360° - 2\alpha)$ wherein $\alpha$ is an angle between said first and second tube arms when said tube arms are rotated relative to each other to accommodate a predetermined smallest eye spacing.

9. The microscope of claim 8, said bearing faces all being flat bearing faces defining respective planes perpendicular to said axis.

* * * * *